United States Patent [19]

Deleens et al.

[11]  4,234,184
[45]  Nov. 18, 1980

[54] THERMOPLASTIC POLYMER COVER FOR GOLF BALLS AND GOLF BALLS COMPRISING SUCH A COVER

[75] Inventors: Gerard Deleens, Bernay; Bernard Guerin, Bures sur Yvette; Rene Kern, Savigny sur Orge, all of France

[73] Assignee: ATO Chimie, Courbevoie, France

[21] Appl. No.: 12,431

[22] Filed: Feb. 15, 1979

[30] Foreign Application Priority Data

Feb. 24, 1978 [FR] France .................................. 78 05285

[51] Int. Cl.³ ........................ A63B 37/12; C28G 69/44
[52] U.S. Cl. ................................ 273/235 R; 156/146; 525/408; 525/430
[58] Field of Search ................. 260/857 PG; 156/146; 525/408, 411, 430; 273/235 R

[56] References Cited

U.S. PATENT DOCUMENTS

| 3,395,109 | 7/1968 | Molitor | 156/146 |
| 3,522,329 | 7/1970 | Okazaki | 260/857 PG |
| 3,632,666 | 1/1972 | Okazaki | 260/857 PG |
| 3,636,135 | 1/1972 | Garforth | 260/857 PG |
| 3,655,821 | 4/1972 | Lofquist | 260/857 PG |
| 3,660,356 | 5/1972 | Radlmann | 260/857 PG |
| 3,839,245 | 10/1974 | Schlossman | 260/857 PG |

FOREIGN PATENT DOCUMENTS 2273021 12/1975 France ............................... 260/857 PG

*Primary Examiner*—Paul Lieberman
*Attorney, Agent, or Firm*—Burgess, Ryan and Wayne

[57] ABSTRACT

Thermoplastic polymer cover for golf balls.

The thermoplastic polymer material constituting the cover consists of a poly(ether-ester-amide) sequenced copolycondensate having special characteristics.

Such a cover has good mechanical characteristics and confers on the golf balls so covered a satisfactory "feel" and "click".

15 Claims, No Drawings

THERMOPLASTIC POLYMER COVER FOR GOLF BALLS AND GOLF BALLS COMPRISING SUCH A COVER

The invention is directed to a thermoplastic polymer cover for golf balls and also relates to golf balls comprising such a cover.

Golf balls with such a cover are used for practice golf as well as competition golf. Such balls usually have a polymer-based cover around a nucleus or core of the ball, which may be either of the so-called "wound" type, i.e. consisting for example of a central sphere, particularly a sphere in rubber, metal or glass, or a sphere made of a bag filled with paste, on which is wound a special elastic wire, or of the so-called "monoblock" type, i.e. comprising a single sphere or several concentric spheres of elastomeric material.

The polymer material from which golf ball covers are produced is most often chosen from among the natural elastomers, such as natural balata or gutta percha, or synthetic materials such as synthetic transpolyisoprene, neoprene, theremoplastic polymers such as polyethylene or polypropylene, ionomer resins, ethylene and vinyl acetate copolymers. The cover thus obtained from a polymer material of the above-mentioned type has certain drawbacks and particularly an inadequate service-life, a weak breakage resistance and inadequate qualities with respect to the "feel" and "click". It was indeed proposed to improve the characteristics of the golf ball covers by using for said covers polymer compositions, particularly based on styrene, butadiene or isoprene elastomeric block copolymer or a mixture of an ionomer resin with a chlorosulfonated polyethylene or an ethylene and vinyl acetate copolymer. However, the covers prepared from these compositions were not judged wholly satisfactory.

The present invention concerns golf ball covers made of a thermoplastic polymer material comprising a specific poly (ether-ester-amide) sequenced copolycondensate, said polymer material conferring on the cover an extended service-life and a high breakage resistance as well as a satisfactory "feel" and "click" to golf balls with such a cover. In addition, the sequenced copolycondensate covers can be manufactured by injection moulding which enables a high production-rate. The thermoplastic polymer material cover for golf balls according to the invention is characterized in that the said thermoplastic polymer material consists in a poly (ether-ester-amide) sequenced copolycondensate produced from the copolycondensation of a $\alpha,\omega$-dicarboxylic copolyamide having an average molecular weight comprised between 300 and 15,000 with an aliphatic $\alpha,\omega$-dihydroxyl polyalkylene glycol having an average molecular weight comprised between 100 and 6,000, the sequenced copolycondensate containing 5 to 85% by weight of polyoxyalkylene glycol and having a melting point comprised between 80° C. and 150° C. and a Shore D hardness ranging between 35 and 70. In the afore-mentioned definition, by a poly (ether-ester-amide) sequenced copolycondensate is also meant a single poly (ether-ester-amide) sequenced copolycondensate having the afore-mentioned characteristics as well as a mixture of such sequenced copolycondensates.

According to one embodiment of the invention the Shore D hardness of the sequenced copolycondensate constituting the cover is comprised between 45 and 60.

According to another embodiment of the invention the sequenced copolycondensate has a melting point comprised between 100° and 140° C.

The $\alpha,\omega$-dicarboxylic copolyamide reacting with the $\alpha,\omega$-dihydroxyl polyoxyalkylene glycol to constitute the sequenced copolycondensate has advantageously a melting point comprised between 80° and 150° C., the said melting point being preferably comprised between 100° and 140° C.

The average molecular weights of the copolyamide and polyoxyalkylene glycol, which may vary between the afore-mentioned ranges, are preferably comprised between 800 and 5,000 for the $\alpha,\omega$-dicarboxylic copolyamide and between 200 and 3,000 for the $\alpha,\omega$-dihydroxyl polyoxyalkylene glycol.

In addition, the weight proportion of polyoxyalkylene glycol in the sequenced copolycondensate is preferably between 10 and 50% with respect to the said sequenced copolycondensate.

The reaction of the copolycondensation between the $\alpha,\omega$-dicarboxylic copolyamide and the $\alpha,\omega$-dihydroxyl polyoxyalkylene glycol in order to constitute the poly (ether-ester-amide) sequenced copolycondensate constituting the golf ball cover according to the invention is effected by contacting, in the presence of a catalyst and while stirring, the said reagents, in a molten state, that is at temperatures above the melting points of the $\alpha,\omega$-dicarboxylic copolyamide and the $\alpha,\omega$-dihydroxyl polyoxyalkylene glycol. The temperatures selected for this reaction must be sufficient to maintain the molten mixture in a state sufficiently fluid to allow by stirring a good contact of the reagents. These temperatures, selected above the melting points of the dicarboxylic copolyamide and the dihydroxyl polyoxyalkylene glycol may be advantageously comprised between 100° and 400° C. and are preferably between 200° and 300° C.

The copolycondensation reaction may be effected, according to requirements, under a higher or lower vacuum which may reach 0.05 torr or under inert atmospheric pressure at a pressure equal or close to atmospheric pressure.

In order for the copolycondensation reaction to take place in the most favorable conditions for the obtention of the sequenced copolycondensates, it is preferable to respect the equimolecularity between the carboxylic groups of the $\alpha,\omega$-dicarboxylic copolyamide and the hydroxyl groups of the $\alpha,\omega$-dihydroxyl polyoxyalkylene glycol which are reacting together.

The catalyst used to promote the copolycondensation reaction between the copolyamide and the polyoxyalkylene glycol can be one of the catalysts known in the prior art. In particular, can be used a titanium tetra alkoxide based catalyst as described in more details in French Patent Application No. 74 18,913 (publication No. 2 273 021) of May 31, 1974 or a zirconium or hafnium tetra alkoxide based catalyst as proposed in French Patent Application No. 77 26678 of Sept. 2, 1977 in the name of ATO CHIMIE, the proportion of the catalyst being that cited in the said references.

The copolycondensation reaction producing a sequenced copolycondensate may be carried out as a batch-type or continuous operation and, in the latter case, the thin-film technique as described in French Patent Application No. 77 39790 of Dec. 30, 1977 in the name of ATO CHIMIE can be used.

The $\alpha,\omega$-dicarboxylic copolyamide, i.e. having a carboxylic group at each of its chain-ends, with a melting point comprised between 80° and 150° C., and preferably between 100° and 140° C., is obtained by polycondensating, as is well known in the art, a mixture of at least two precursors (or precursor compounds) of polyamides selected from among lactams, aliphatic amino acids, and aliphatic dicarboxylic acid salts of aliphatic diamines, in the presence of a suitable quantity of organic dicarboxylic acid whose carboxylic groups are preferably fixed at each end of the molecule; the relative proportions of the precursor compounds in the mixture subjected to polycondensation, are selected such that the $\alpha,\omega$-dicarboxylic copolyamide thus produced has a melting point comprised in the appropriate range, namely between 80° and 150° C. and preferably between 100° and 140° C.

During the copolycondensation takes place the fixing of the organic dicarboxylic acid on the copolyamide macromolecular chain, more particularly at its chain-ends; this leads to the obtention of a $\alpha,\omega$-dicarboxylic copolyamide.

The precursor compounds from which the $\alpha,\omega$-dicarboxylic copolyamide is formed are preferably selected from the group formed by $C_6$ to $C_{14}$-lactams, $C_6$ to $C_{14}$-aliphatic amino acids for which functional groups are preferably end groups, and $C_6$ to $C_{14}$-aliphatic dicarboxylic acid salts of $C_6$ to $C_{14}$-aliphatic diamines and most particularly from the group formed by caprolactam, oenantholactam, decanolactam, undecanolactam, dodecanolactam, 6-amino caproic acid, 11-aminoundecanoic acid, 12-aminododecanoic acid, adipic salts of hexamethylene diamine, azelaic acid sebacic acid and 1,12-dodecanedioic acid, and adipic acid salts of nonamethylene diamine.

The organic dicarboxylic acids, which are used in the synthesis reaction of a $\alpha,\omega$-dicarboxylic copolyamide, on the one hand permitting the fixation of a carboxylic group at each of the copolyamide chain ends and acting, on the other hand, as chain-limiters, are $C_4$ to $C_{20}$ dicarboxylic acids, particularly alkanedioic acids such as, for example, succinic, adipic, suberic, azelaic, sebacic, undecanedioic and dodecanedioic acids, or dicarboxylic cycloaliphatic or aromatic acids such as, for example, terephthalic, isophthalic, 1.4-cyclohexane dicarboxylic acid. These organic dicarboxylic acids are used in suitable quantities to obtain a copolyamide having an average molecular weight in accordance with standard calculations for the polycondensation techniques.

As afore-mentioned the average molecular weights of the $\alpha,\omega$-dicarboxylic copolyamides are between 300 and 15,000, and are preferably comprised between 800 and 5,000.

The $\alpha,\omega$-dicarboxylic polyoxyalkylene glycols, i.e. having a hydroxyl group at each of the chain-ends, involve according to the invention linear or branched polyoxyalkylene glycols whose alkylene radical contains at least two carbon atoms, the copolymers deriving from such polyoxyalkylene glycols, and mixtures of such polyoxyalkylene glycols and/or their copolymers. Most suitable are polyoxyalkylene glycols, polyoxypropylene glycols, polyoxytetramethylene glycols, copolymers deriving from such polyoxyalkylene glycols and mixtures of such polyoxyalkylene glycols and/or their copolymers.

As afore-mentioned the average molecular weights of the $\alpha,\omega$-polyoxyalkylene glycols can vary between 100 and 6,000, and are comprised preferably between 200 and 3,000.

The proportion of $\alpha,\omega$-dihydroxyl polyoxyalkylene glycol reacting with the $\alpha,\omega$-dicarboxylic copolyamide is such that the poly(ether-ester-amide) sequenced copolycondensate thus obtained contains 5 to 85%, and preferably 10 to 50%, by weight of polyoxyalkylene glycol.

To the sequenced copolycondensate constituting the cover for golf balls according to the invention may be incorporated various additives, particularly stabilizers against light and heat, antioxidizers, pigments such as titanium dioxide or fillers, these additives being used in conventional proportions to obtain the required effect. The incorporation of additives to the sequenced copolycondensate can be made by mixing a mixture of the sequenced copolycondensate and of additives in a mixing apparatus, for example a Banbury mixer, at a temperature high enough to obtain a homogeneous mass. Furthermore, additives may be added to the nascent sequenced copolycondensate which forms during copolycondensation. It is also possible in the scope of the invention to incorporate in the sequenced copolycondensate a minor quantity of one or several copolymers compatible with the sequenced copolycondensate and having a melting point and a Shore D hardness comparable to that of the sequenced copolycondensate.

The manufacture of the golf ball cover obtained from the sequenced copolycondensate and the application of the cover on any type of core, particularly a core of the so-called "wound" type or a core of the "monoblock" type, to constitute a golf ball may be realized by known techniques of the prior art.

For example, hemispheric skeletons may be constituted by compression moulding a calandered or extruded sheet or small quantities of extruded material obtained from the sequenced copolycondensation, then adjusting two of these skeletons on the core of the ball, and moulding the structure thus produced at a temperature and a pressure such that the said skeletons weld together by melting, while during the course of the operation printing any suitable design appearing on the outside surface of the cover. Furthermore, such hemispheric skeletons may be prepared by injection moulding, the two skeletons being adjusted on the core of the ball, and the structure moulded as described in the preceding case.

It is also possible to directly mould by injection the cover on the core while in one or several steps constituting a smooth structure which is then moulded by compression or to produce a ball whose outside surface includes a design.

The balls produced from the afore-mentioned operations are then subjected to finishing processes during which the said balls are polished, and, if necessary, painted and marked and are then finally conditioned.

The methods of control and identification selected to characterize the products were the following:
 inherent viscosity (determined at 25° C. at 0.5% by weight solution in metacresol)
 tensile strength and extension (measured according to the standard ASTM D638 67T)
 VICAT point in °C. (expressed according to the standard ASTM D1525 65T)
 apparent torsion modulus (measured according to the standard ASTM D1043 61T according to the CLASH and BERG method)
 permanent set at 100% extension at 20° C. (determined according to the standard ASTM D412)
 Shore D hardness (measured according to the standard ASTM D2240)
 dynstat shock at 23° C.

abrasion resistance (determined according to the standard BS 903 part A9 with the use of the DUPONT GRASSELLI apparatus and use of a TRI-M-ITE No. 180 abrasive paper.

The invention is illustrated by the following examples which are given only as a title of simple illustration without limiting the scope of the present invention. Unless specified the proportions are expressed in weight percentages relative to the total weight of the constituents of the copolycondensate.

EXAMPLES 1 to 4

Poly (ether-ester-amide) sequenced copolycondensates are prepared for use as golf ball covers by copolycondensation of a $\alpha,\omega$-dicarboxylic copolyamide having an appropriate melting point and an appropriate average molecular weight ($\overline{Mn}$) with an appropriate $\alpha,\omega$-dihydroxyl polyoxyalkylene glycol in order to form a reaction mixture containing $\alpha,\omega$-dicarboxylic copolyamide and $\alpha,\omega$-dihydroxyl polyoxyalkylene glycol as well as 0.2% (in weight expressed relatively to the total weight of the said constituents) of zirconium tetrabutoxide as catalyst, and by maintaining the said reaction mixture during two hours under vigorous stirring at a temperature of 260° C. and under a vacuum of 0.1 torr.

The sequenced copolycondensates thus obtained are the following:

poly (ether-ester-amide) sequenced copolycondensate resulting from the copolycondensation of a $\alpha,\omega$-dicarboxylic copolyamide containing 40% by weight of units derived from caprolactam and 60% by weight of units derived from undecanoic 11-amino acid and having a melting point of 125° C. and an average molecular weight ($\overline{Mn}$) equal to 2,000 with a $\alpha,\omega$-dihydroxyl polytetramethylene glycol having an average molecular weight ($\overline{Mn}$) equal to 650, the said sequenced copolycondensate containing by weight 24.5% polyoxytetramethylene glycol and having a melting point of 125° C. and an inherent viscosity equal to 1.29 (example 1). This product is designed by the abbreviated form PA 6-11/PTMG.

poly (ether-ester-amide) sequenced copolycondensate obtained from the copolycondensation of a $\alpha,\omega$-dicarboxylic copolyamide containing by weight 40% of units derived from caprolactam and 60% of units derived from undecanoic 11-amino acid and having a melting point of 126° C. and an average molecular weight equal to 2,000 with a $\alpha,\omega$-dihydroxyl polyoxypropylene glycol having an average molecular weight equal to 630, the said sequenced copolycondensate containing by weight 24% polyoxypropylene glycol and having a melting point of 126° C. and an inherent viscocity equal to 0.92 (example 2). This product is designated by the abbreviated form PA 6-11/PPG.

poly (ether-ester-amide) sequenced copolycondensate obtained from the copolycondensation of a $\alpha,\omega$-dicarboxylic copolyamide containing by weight 40% of units derived from caprolactam, 20% of units derived from adipic acid salt of hexamethylene diamine, and 40% of units derived from dodecalactam and having a melting point of 112° C. and an average molecular weight equal to 2,000 with a $\alpha,\omega$-dihydroxyl polyoxytetramethylene glycol equal to 650, the said sequenced copolycondensate containing by weight 24.5% polyoxytetramethylene glycol having a melting point of 112° C. and an inherent viscocity equal to 1.32 (example 3). This product is designated by the abbreviated form PA 6-6, 6-12/PTMG.

poly (ether-ester-amide) sequenced copolycondensate obtained from the copolycondensation of a $\alpha,\omega$-dicarboxylic copolyamide containing by weight 33% of units derived from caprolactam, 33% of units derived from undecanoic 11-amino acid and 34% of units derived from dodecalactam and having a melting point of 102° C. and an average molecular weight equal to 2,460 with hydroxyl polyoxytetramethylene glycol having an average molecular weight equal to 740, said sequenced copolycondensate containing by weight 23% polyoxytetramethylene glycol and having a melting point of 102° C. and an inherent viscocity equal to 1.38 (example 4). This product is designated by the abbreviated form PA 6-11-12/PTMG.

Golf balls having a core of the so-called "wound" type with a diameter of 38.6 mms covered by a cover consisting of one of the afore-mentioned sequenced copolycondensates and having a thickness of 1.3 mm are manufactured according to the following: Two hemispheric skeletons were produced by injection moulding of a sequenced copolycondensate. The skeletons thus obtained were assembled on the core of the ball and the structure thus obtained was then moulded by compression to realize, on the one hand, the fusion of the seam of the two hemispheric parts of the cover. and, on the other hand, the impression of a design on the surface of the said cover; the moulded product obtained was then cooled. The ball obtained was then subjected to a polishing process to eliminate the burr.

The mechanical characteristics of the cover produced from the afore-mentioned copolycondensates are grouped together in the table shown here-under.

The cover, whose mechanical characteristics are shown in the table, has good to very good breakage resistance and confers in addition on the golf balls a satisfactory "feel" and "click".

In addition, in comparison to a cover of the same dimensions produced from a commercial ionomer resin, the cover obtained from a sequenced copolycondensate of Example 1 had an abrasion resistance clearly superior (losses total only 0.5 cm$^3$ after 1,000 revolutions for the copolycondensates as against 1.2 cm$^3$ after 1,000 revolutions for the ionomer resin).

TABLE

| EXAMPLE | 1 | 2 | 3 | 4 |
|---|---|---|---|---|
| Nature of the sequenced copolycondensate | PA6-11/PTMG | PA6-11/PPG | PAG-G,6-12/PTMG | PA6-11-12 PTMG |
| Tension (kg/cm$^2$): | | | | |
| - flow-point | 80 | 65 | 75 | 80 |
| - rupture | 245 | 230 | 190 | 200 |
| Extension (%) | | | | |
| - flow-point | 12 | 10 | 10 | 11 |

TABLE-continued

| EXAMPLE | 1 | 2 | 3 | 4 |
|---|---|---|---|---|
| - rupture | 340 | 470 | 365 | 390 |
| VICAT point under 1 kg. (C.°) | 106 | 100 | 73–76 | 80–82 |
| Apparent torsion modulus: | 550 | 550 | 630 | 550 |
| Permanent set (%): | 54 | 60 | 62 | 61 |
| Shore D hardness: | 50–53 | 50 | 46 | 46–48 |
| Dynstat shock: | | | | |
| - non-notched | unbroken | unbroken | | |
| - notched | unbroken | unbroken | | |

What is claimed is:

1. A golf ball having a core and a cover of thermoplastic polymeric material surrounding the core which comprises a thermoplastic polymer material comprising a poly(ether-ester-amide) sequenced copolycondensate obtained from the copolycondensation of an $\alpha,\omega$-dicarboxylic copolyamide having an average molecular weight between 300 and 15,000 with an $\alpha,\omega$-dihydroxyl aliphatic polyoxyalkylene glycol of an average molecular weight between 100 and 6,000, the sequenced copolycondensate containing 5 to 85% by weight of polyoxyalkylene glycol moieties and having a melting point between 80° and 150° C. and a Shore D hardness between 35 and 70.

2. A cover according to claim 1, wherein the Shore D hardness of the sequenced copolycondensate is between 45 and 60.

3. A cover according to claim 1, wherein the melting point of the sequenced copolycondensate is between 100° and 140° C.

4. A cover according to claim 1, wherein the $\alpha,\omega$-dicarboxylic copolyamide reacting with the $\alpha,\omega$-dihydroxyl polyoxyalkylene glycol to form the sequenced copolycondensate has a melting point between 80° and 150° C.

5. A cover according to claim 1, wherein the average molecular weight of the $\alpha,\omega$-dihydroxyl copolyamide reacting with the $\alpha,\omega$-dihydroxyl polyalkylene glycol to form the sequenced copolycondensate is between 800 and 5,000.

6. A cover according to claim 1, wherein the average molecular weight of the $\alpha,\omega$-dihydroxyl polyoxyalkylene glycol, reacting with the $\alpha,\omega$-dicarboxylic copolyamide to form the sequenced copolycondensate is between 200 and 3,000.

7. A cover according to claim 1, wherein the proportion of polyoxyalkylene glycol in the sequenced copolycondensate is 10 to 50% by weight of the said sequenced copolycondensate.

8. A cover according to claim 1, wherein the $\alpha,\omega$-dicarboxylic copolyamide reacting with the $\alpha,\omega$-hydroxyl polyoxyalkylene glycol to form a sequenced copolycondensate is obtained by copolycondensation in the presence of an appropriate quantity of organic dicarboxylic acid, and a mixture of at least two precursors of polyamides selected from the group consisting of lactams, aliphatic amino-acids and aliphatic dicarboxylic acid salts with aliphatic diamines, the relative proportions of the precursors being selected to form an $\alpha,\omega$-dicarboxylic copolyamide having a melting point between 80° and 150° C.

9. A cover according to claim 8, wherein the precursor compounds for the $\alpha,\omega$-dicarboxylic copolyamide are selected from the group consisting of $C_6$ to $C_{14}$ lactams, $C_6$ to $C_{14}$ aliphatic amino acids and $C_6$ to $C_{14}$ aliphatic dicarboxylic acid salts with $C_6$ to $C_{14}$ aliphatic diamines.

10. A cover according to claim 1, wherein the $\alpha,\omega$-dihydroxyl aliphatic polyoxyalkylene glycols are selected from the group consisting of linear and branched $\alpha,\omega$-dihydroxyl aliphatic polyoxyalkylene glycols wherein the alkylene radical contains at least two carbon atoms, copolymers of said polyoxyalkylene glycols, and mixtures of said polyoxyalkylene glycols and their copolymers.

11. A cover according to claim 1, wherein the aliphatic $\alpha,\omega$-dihydroxyl polyoxyalkylene glycols are selected from the group consisting of polyoxyethylene glycols, polyoxypropylene glycols, polyoxytetramethylene glycols, copolymers of said polyoxyalkylene glycols, and mixtures of said polyoxyalkylene glycols and their copolymers.

12. A cover according to claim 1, wherein additives, selected from the group consisting of light and heat stabilizers, antioxidants, pigments and fillers, are incorporated in the sequenced copolycondensate.

13. A cover according to claim 1, wherein one or more polymers compatible with the sequenced copolycondensate and having a melting point and a Shore D hardness comparable to those of the said sequenced copolycondensate are admixed in a minor proportion with the sequenced copolycondensate.

14. The cover of claim 8 wherein the precursor compounds for forming the $\alpha,\omega$-dicarboxylic copolyamide are selected from the group consisting of caprolactam, oenantholactam, decanolactam, undecanolactam, dodecanolactam, caproic 6-amino acid, undecanoic 11-amino acid, dodecanoic 12-amino acid, diamine hexamethylene salts of adipic acid, azeleic acid, sebacic acid and 1,12-dodecanoic acid and the diamine nonamethylene salt of adipic acid.

15. A cover according to claim 4 wherein the sequenced copolycondensate has a melting point between 100° and 140° C.

* * * * *

UNITED STATES PATENT AND TRADEMARK OFFICE
CERTIFICATE OF CORRECTION

PATENT NO. : 4,234,184
DATED : Nov. 18, 1980
INVENTOR(S) : Gerard Deleens, et al It is certified that error appears in the above—identified patent and that said Letters Patent is hereby corrected as shown below:

Column 1, line 23: "theremoplastic" should be
--thermoplastic--.

Column 3, line 51: "$\alpha,\omega$-dicarboxylic polyoxyalkylene glycols" should be -- $\alpha,\omega$-dihydroxyl polyoxyalkylene glycols--.

Column 3, line 58: "polyoxyalkylene glycols" should be --polyoxyethylene glycols--.

Column 6, in the Table, under Example 3: "PAG-G,6-12/" should be --PA6-6,6-12/--.

Column 7, line 39: "$\alpha,\omega$-dihydroxyl copolyamide" should be --$\alpha,\omega$-dicarboxylic copolyamide--.

Column 7, line 58: "and a mixture" should be --of a mixture--.

Column 8, line 54: "azeleic acid" should be --azelaic acid--.

Signed and Sealed this

Fourteenth Day of April 1981

[SEAL]

Attest:

RENE D. TEGTMEYER

Attesting Officer   Acting Commissioner of Patents and Trademarks